(12) United States Patent
Frederick et al.

(10) Patent No.: US 10,104,978 B2
(45) Date of Patent: Oct. 23, 2018

(54) RESTING SURFACES FOR VEHICLE OCCUPANTS

(71) Applicant: Toyota Motor Engineering & Manufacturing North America, Inc., Erlanger, KY (US)

(72) Inventors: Scott L. Frederick, Brighton, MI (US); Ryan C. Harris, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 39 days.

(21) Appl. No.: 15/244,493

(22) Filed: Aug. 23, 2016

(65) Prior Publication Data

US 2018/0055233 A1 Mar. 1, 2018

(51) Int. Cl.
*B62D 33/02* (2006.01)
*A47C 17/80* (2006.01)

(52) U.S. Cl.
CPC .......... *A47C 17/80* (2013.01); *B62D 33/0207* (2013.01)

(58) Field of Classification Search
CPC .............. B62D 33/0612; B62D 21/152; B62D 25/088; B62D 25/12; B62D 29/008; B62D 33/02; B62D 33/027; A47C 13/00; A47C 17/32; A47C 17/48; A47C 17/84; A47C 19/205
USPC ....... 296/174, 100.18, 159, 164; 5/118, 119, 5/9, 1, 10.2, 310, 509.1, 133, 136; 135/115, 126, 148, 152, 904
See application file for complete search history.

(56) References Cited

U.S. PATENT DOCUMENTS

| | | | |
|---|---|---|---|
| 6,167,898 B1 * | 1/2001 | Larga | E04H 15/20 135/124 |
| 7,021,694 B1 | 4/2006 | Roberts et al. | |
| 8,136,182 B2 * | 3/2012 | Ellis | A47C 17/80 5/118 |

(Continued)

OTHER PUBLICATIONS

Sunny Skyz, "What This Guy Built is Brilliant, and Going to Make Truck Owners Very Jealous", dated Oct. 17, 2014, Retrieved from the Internet: <http://www.sunnyskyz.com/blog/494/What-This-Guy-Built-Is-Brilliant-And-Going-To-Make-Truck-Owners-Very-Jealous>, [retrieved Jun. 16, 2016] (25 pages).

(Continued)

*Primary Examiner* — D Glenn Dayoan
*Assistant Examiner* — Sunsurraye Westbrook
(74) *Attorney, Agent, or Firm* — Christopher G. Darrow; Darrow Mustafa PC

(57) ABSTRACT

A resting surface accessory can be used within a vehicle space to provide a resting surface for one or more vehicle occupants. As an example, the resting surface accessory can be used in the bed of a pickup truck. The resting surface accessory includes a main body. The main body can have a first lateral side and an opposite second lateral side. The main body can include a central region with a plurality of sleeves. Each of the sleeves can define a cavity. The plurality of sleeves can be spaced from the first lateral side and the second lateral side. The resting surface accessory includes a first connector. The first connector can be operatively connected to the main body and can extend along the first lateral side. The resting surface accessory can include a second connector operatively connected to the main body and extending along the second lateral side.

20 Claims, 5 Drawing Sheets

(56) References Cited

U.S. PATENT DOCUMENTS

| | | | |
|---|---|---|---|
| 8,234,728 B2* | 8/2012 | Pittman | A47C 17/80 5/118 |
| 9,179,759 B1* | 11/2015 | Turner | A45F 3/22 |
| 2002/0083528 A1* | 7/2002 | Fisher | A47C 27/081 5/706 |

OTHER PUBLICATIONS

Jammock, "Truck Hammock Sold Out", Retrieved from the Internet: <http://www.jammock.com/truck_hammock_sold_out>, [retrieved Jun. 16, 2016] (3 pages).

* cited by examiner

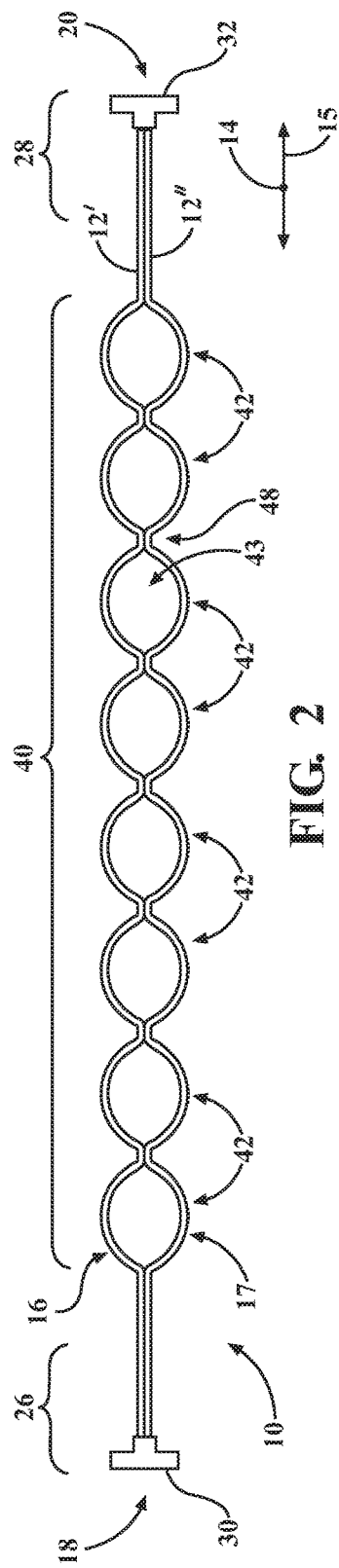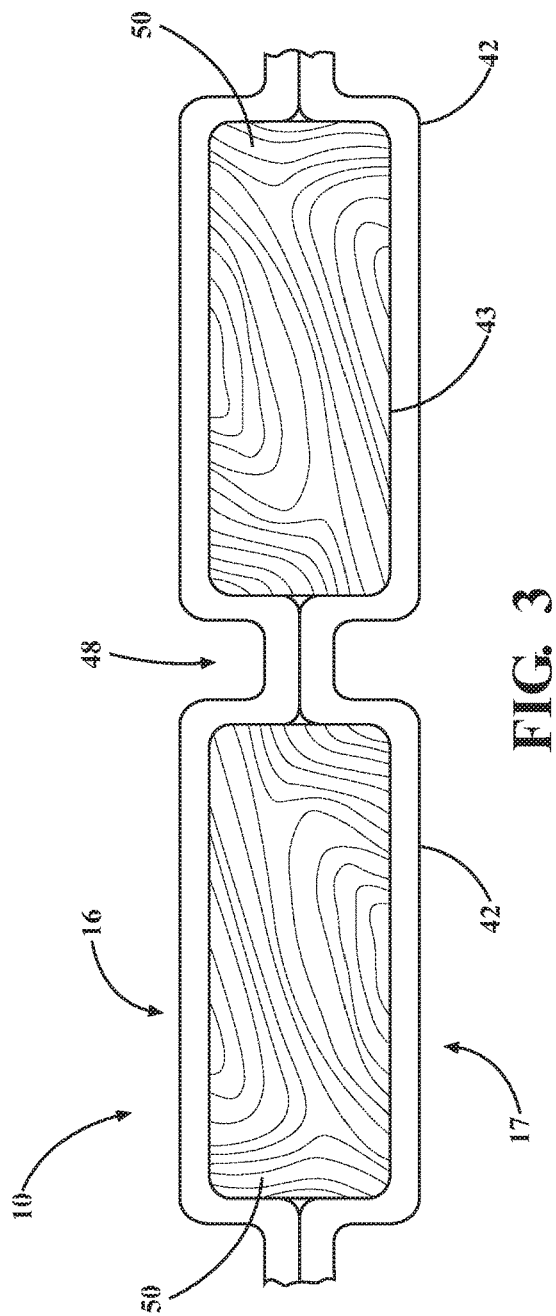

RESTING SURFACES FOR VEHICLE OCCUPANTS

FIELD

The subject matter described herein relates in general to vehicles and, more particularly, to vehicles with relatively large open spaces.

BACKGROUND

Some motor vehicles have storage spaces located behind a passenger seating area. For example, pickup trucks are motor vehicles with a rear open top cargo area, which is commonly referred to as a bed. The bed allows the vehicle to be utilized in many different ways, including carrying or storing various types of cargo (e.g., tools, groceries, sporting equipment, etc.).

SUMMARY

In one respect, the present disclosure is directed to a resting surface accessory for one or more vehicle occupants. The resting surface accessory can include a main body. The main body can have a first lateral side and an opposite second lateral side. The main body can include a central region with a plurality of sleeves. Each of the sleeves can define a cavity. The plurality of sleeves can being spaced from the first lateral side and the second lateral side. The resting surface accessory can include a first connector operatively connected to the main body and extending along the first lateral side. The resting surface accessory can include a second connector operatively connected to the main body and extending along the second lateral side.

In another respect, the present disclosure is directed to a system. The system can include a vehicle space. The vehicle space can be defined in part by a floor, a first lateral side wall, and a second lateral side wall. The first lateral side wall can be spaced from and opposite to the second lateral side wall. The system can include a resting surface accessory. The resting surface accessory can include a main body. The main body can have a first lateral side and an opposite second lateral side. The main body can include a central region with a plurality of sleeves. Each of the sleeves can define a cavity. The plurality of sleeves can be spaced from the first lateral side and the second lateral side. The resting surface accessory can include a first connector operatively connected to the main body and extending along the first lateral side. The resting surface accessory can include a second connector operatively connected to the main body and extending along the second lateral side. The first lateral side of the resting surface accessory can be being operatively connected to the first lateral side wall of the vehicle space by the first connector. The second lateral side of the resting surface accessory can be operatively connected to the second lateral side wall of the vehicle space by the second connector. The resting surface accessory can be spaced from the floor such that a storage space is defined therebetween. At least the central region of the resting surface accessory can define a support surface.

In still another respect, the present disclosure is directed to a system. The system can include a pickup truck. The pickup truck can include a bed. The bed can have a floor, a first lateral side wall, and a second lateral side wall. The first lateral side wall can be spaced from and opposite to the second lateral side wall. The system can include a resting surface accessory. The resting surface accessory can include a main body. The main body can have a first lateral side and an opposite second lateral side. The main body can include a central region with a plurality of sleeves. Each of the sleeves can define a cavity. The plurality of sleeves can be spaced from the first lateral side and the second lateral side. The resting surface accessory can include a first connector operatively connected to the main body and extending along the first lateral side. The resting surface accessory can include a second connector operatively connected to the main body and extending along the second lateral side. The first lateral side of the resting surface accessory can be operatively connected to the first lateral side wall of the bed by the first connector. The second lateral side of the resting surface accessory can be operatively connected to the second lateral side wall of the bed by the second connector. The resting surface accessory can be spaced from the floor such that a storage space is defined therebetween. At least a portion of the central region of the resting surface accessory can define a support surface. The support surface can extend substantially horizontally across the bed.

BRIEF DESCRIPTION OF THE DRAWINGS

FIG. 2 is a view of the resting surface accessory.

FIG. 3 is a close-up view of a portion of a central region of the resting surface accessory.

DETAILED DESCRIPTION

Figure 1:
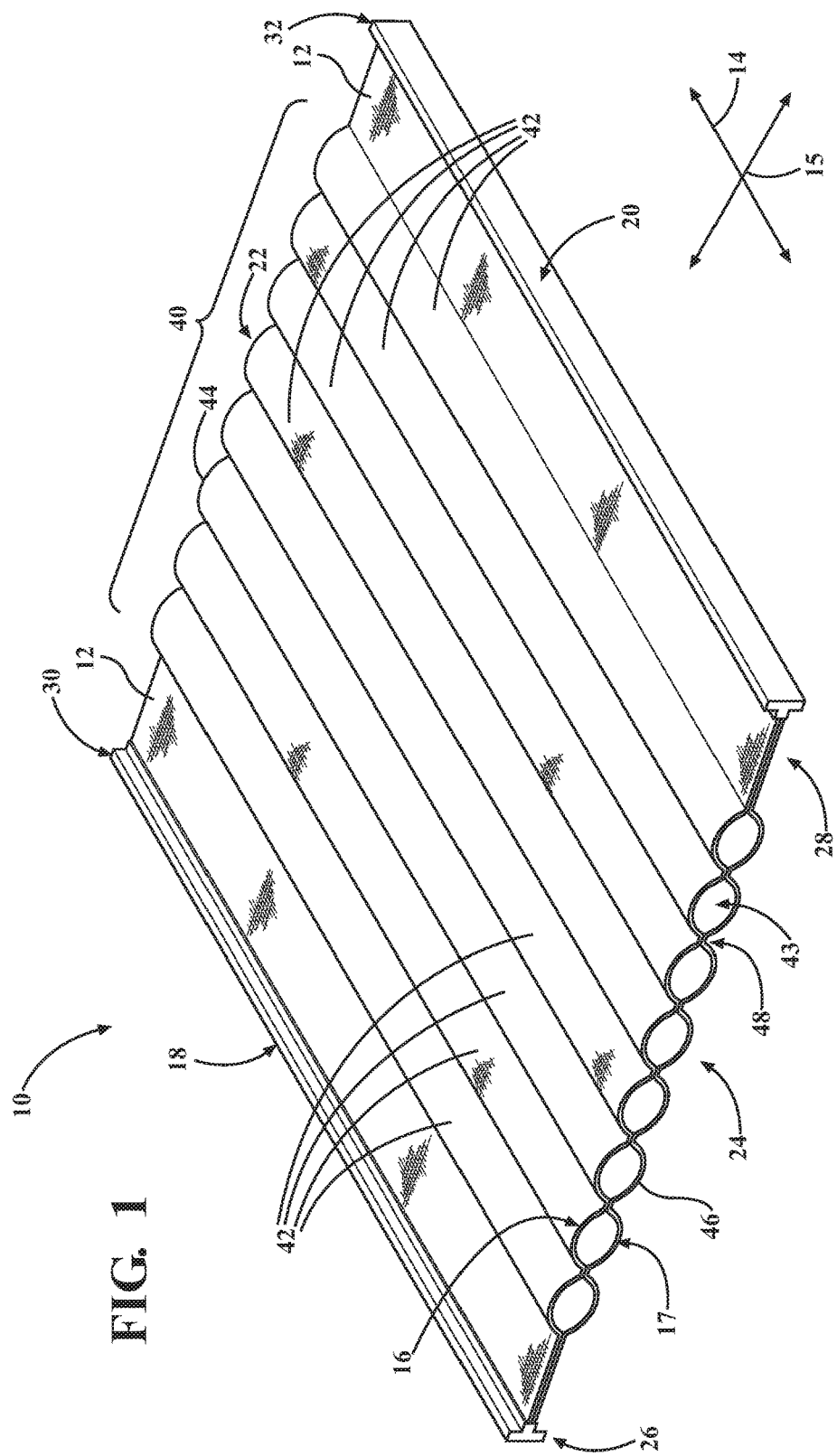
FIG. 1 is an example of a resting surface accessory for a vehicle.

This detailed description relates to providing a resting surface for a vehicle occupant within a vehicle space. For instance, a resting surface accessory can be used within a vehicle space (e.g., the bed of a pickup truck) to provide a resting surface for one or more vehicle occupants. The resting surface accessory includes a main body. The main body can have a first lateral side and an opposite second lateral side. The main body can include a central region with a plurality of sleeves. Each of the sleeves can define a cavity. The plurality of sleeves can be spaced from the first lateral side and the second lateral side. The resting surface accessory includes a first connector. The first connector can be operatively connected to the main body and can extend along the first lateral side. The resting surface accessory can include a second connector operatively connected to the main body and extending along the second lateral side. The present detailed description relates to apparatus and/or systems that incorporate one or more of such features. In at least some instances, arrangements described herein can increase the usage of vehicle spaces while facilitating the comfort and/or convenience of vehicle occupants.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIGS. 1 and 2, an example of a resting surface accessory 10 for a vehicle is shown. The resting surface accessory 10 can include a main body 12. The main body 12 of the resting surface accessory 10 can be made of any suitable material(s). For instance, the main body 12 of the resting surface accessory 10 can be made of one or more flexible materials. In one or more arrangements, the main body 12 of the resting surface accessory 10 can be made of canvas.

The main body 12 can have any suitable size, shape, and/or configuration. In one or more arrangements, the main body 12 can be substantially rectangular. As used herein, the term "substantially" includes exactly the term it modifies and slight variations therefrom (e.g., within normal manufacturing tolerances, within about 10 degrees or less, within about 5 degrees or less, within about 4 degrees or less, within about 3 degrees or less, within about 2 degrees or less, or within about 1 degree or less. The resting surface accessory 10 can have an associated longitudinal direction 14 and an associated lateral direction 15. The resting surface accessory 10 can have an upper side 16 and a lower side 17. The terms "longitudinal", "lateral", "upper", and "lower" are used for convenience with respect to the corresponding directions of a vehicle in which the resting surface accessory 10 is used. However, it will be understood that these terms are not intended to be limiting.

The main body 12 can have a first lateral side 18 and a second lateral side 20. The first lateral side 18 and the second lateral side 20 can be substantially parallel to each other. The first lateral side 18 can have an associated length, and the second lateral side 20 can have an associated length. The length of the first lateral side 18 can be substantially identical to the length of the second lateral side 20. Alternatively, the length of the first lateral side 18 can be different from the length of the second lateral side 20. In one or more arrangements, the length of the first lateral side 18 and/or the length of the second lateral side 20 can be sized to extend the entire length of an open area of a vehicle (e.g., the bed of a pickup truck, cargo space of a vehicle, etc.). In one or more arrangements, the length of the first lateral side 18 and/or the length of the second lateral side 20 can be sized to extend a majority or a substantial majority of the length of an open area of a vehicle. "Substantial majority" can mean at least about 70%, at least about 75%, at least about 80%, at least about 85%, at least about 90%, or at least about 95%.

The main body 12 can include a forward side 22 and an aft side 24. The terms "forward" and "aft" are used for convenience with respect to the corresponding directions of a vehicle in which the resting surface accessory 10 is used. However, it will be understood that these terms are not intended to be limiting. The forward side 22 and the aft side 24 can be substantially parallel to each other. The forward side 22 can have an associated length. The aft side 24 can have an associated length. The length of the forward side 22 can be substantially identical to the length of the aft side 24. Alternatively, the length of the forward side 22 can be different from the length of the aft side 24. In one or more arrangements, the length of the forward side 22 and/or the length of the aft side 24 can be greater than or equal to the lateral width of a cargo area of a vehicle.

The resting surface accessory 10 can include a first lateral end region 26 and a second lateral end region 28. The first lateral end region 26 can include the first lateral side 18 and a portion of the main body 12 of the resting surface accessory 10. The second lateral end region 28 can include the second lateral side 20 and a portion of the main body 12 of the resting surface accessory 10.

The resting surface accessory 10 can be configured for attachment to a portion of a vehicle, such as, for example, a portion of a bed or cargo area of a pickup truck. To that end, the resting surface accessory 10 can include one or more connectors. For example, the first lateral end region 26 can include one or more first connectors 30, and the second lateral end region 28 can include one or more second connectors 32. The one or more first connectors 30 can extend along the entire length of the first lateral side 18 or along a substantial majority of the length of the first lateral side 18. The one or more second connectors 32 can extend along the entire length of the second lateral side 20 or along a substantial majority of the length of the second lateral side 20.

In arrangements in which there is a plurality of first connectors 30, the plurality of first connectors 30 may be attached to each other, or the plurality of first connectors 30 may be unattached to each other. The plurality of first connectors 30 can be distributed along the first lateral side 18 in any suitable manner. For instance, plurality of first connectors 30 can abut each other in an end to end manner. Alternatively, the plurality of first connectors 30 can be spaced from each other. This description of arrangements in which there is a plurality of first connectors 30 applies equally to arrangements in which there is a plurality of second connectors 32.

The one or more first connectors 30 and the one or more second connectors 32 can be substantially identical to each other, or they can be different. The one or more first connectors 30 and the one or more second connectors 32 can have any suitable size, shape, and/or configuration. In one or more arrangements, the one or more first connectors 30 and/or the one or more second connectors 32 can be substantially T-shaped, as is shown in FIG. 1. The one or more first connectors 30 and the one or more second connectors 32 can be made of any suitable material. For instance, the one or more first connectors 30 and the one or more second connectors 32 can be made of wood, metal, plastic, and/or combinations thereof, just to name a few possibilities.

The one or more first connectors 30 and the one or more second connectors 32 can be operatively connected to the main body 12 (e.g., to a respective one of the first lateral side 18 or the second lateral side 20 and/or to any other portion of the main body 12 of the resting surface accessory 10) in any suitable manner. The term "operatively connected," as used throughout this description, can include direct or indirect connections, including connections without direct physical contact. In one or more arrangements, the one or more first connectors 30 and the one or more second connectors 32 can be operatively connected to the main body 12 by, for example, one or more fasteners, one or more adhesives, and/or one or more forms of mechanical engagement.

The resting surface apparatus can include a central region 40. The central region 40 can be located between the first lateral side 18 and the second lateral side 20. The central region 40 can be spaced from the first lateral side 18 and the second lateral side 20.

The central region 40 can include a plurality of sleeves 42. Each sleeve 42 can define a respective cavity 43. There can be any quantity of sleeves 42. In one or more arrangements, the plurality of sleeves 42 can be substantially identical to each other. Alternatively, one or more of the plurality of sleeves 42 can be different from the other sleeves 42.

In one or more arrangements, the plurality of sleeves 42 can extend substantially parallel to each other. In one or more arrangements, the plurality of sleeves 42 can extend substantially parallel to the first lateral side 18 and/or the second lateral side 20. In one or more arrangements, the plurality of sleeves 42 can extend substantially in the longitudinal direction 14.

The plurality of sleeves 42 can have a forward end 44 and an aft end 46. In one or more arrangements, at least one of the forward end 44 or the aft end 46 can be open. In one or more arrangements, at least one of the forward end 44 or the aft end 46 can be closed. In one or more arrangements, at least one of the forward end 44 or the aft end 46 can be selectively openable and closeable, such as by a zipper, buttons, hook and loop fasteners, and/or other closure element.

The sleeves 42 can have any suitable size, shape, and/or configuration. In one or more arrangements, the sleeves 42 can have a substantially rectangular cross-sectional shape. Other examples of cross-sectional shapes can include substantially circular, substantially semi-circular, substantially oval, or substantially polygonal, just to name a few possibilities. In one or more arrangements, the sleeves 42 can be sized to receive a 2×4 member (e.g., 2×4 lumber) therein.

In one or more arrangements, the sleeves 42 can be substantially adjacent to each other. In one or more arrangements, the sleeves 42 can be spaced from each other. In such arrangements, the main body 12 can include spacer portions 48 (see FIG. 3) between neighboring sleeves 42.

The sleeves 42 can be formed in any suitable manner. In one or more arrangements, the main body 12 of the resting surface accessory 10 can be formed by a plurality of layers. For instance, referring to FIG. 2, the main body 12 can include a first layer 12' and a second layer 12". In one example the first layer 12' and the second layer 12" can be formed by a single piece of material folded upon itself. In another example, the first layer 12' and the second layer 12" can be formed by separate pieces of material stacked upon each other. The first layer 12' and the second layer 12" can be attached to each other in any suitable manner, such as by stitching, adhesives, and/or fasteners, just to name a few possibilities. The sleeves 42 can be formed between local portions of the first layer 12' and the second layer 12" that are not attached to each other.

The sleeves 42 can be configured to receive one or more inserts 50 therein, as is shown in FIG. 3. The inserts 50 can be pre-installed in the sleeves 42 of the resting surface accessory 10. Such pre-installation of the sleeves 42 can occur at a factory. In one or more arrangements, the inserts 50 can be installed in the sleeves 42 by a user before or after operatively connecting the resting surface accessory 10 to a vehicle.

Within each sleeve 42, there can be a single insert 50. Alternatively, there can be a plurality of inserts 50. In such case, the plurality of inserts can be arranged within the sleeve 42 in any suitable manner. In some instances, one or more inserts 50 can be received in each sleeve 42. However, in some instances, one or more of the sleeves 42 may not receive an insert 50.

When an insert 50 is received in the sleeve 42, the sleeve 42 can conform about the exterior of the insert 50. In some instances, the sleeve 42 may stretch to receive the insert 50. In other instances, the sleeve 42 may not conform about the exterior of the insert 50.

The inserts 50 can be made of any suitable material. In one or more arrangements, the inserts 50 can be made of wood. For instance, the inserts 50 can be 2×4 pieces of wood. In one or more arrangements the inserts 50 can be made of metal, plastic, foam, or any other suitable material. In one or more arrangements, the inserts 50 can be a rigid material. In one or more arrangements, the inserts 50 can be a soft material. In one or more arrangements, the inserts 50 can be cushions, pillows, air cells, or inflatable cells.

The inserts 50 can have any suitable size, shape, and/or configuration. In one or more arrangements, the inserts 50 can have a substantially rectangular cross-sectional shape. Other examples of cross-sectional shapes can include substantially circular, substantially semi-circular, substantially oval, or substantially polygonal, just to name a few possibilities.

The inserts 50 can be substantially identical to each other. Alternatively, one or more of the inserts 50 can be different from the other inserts 50 in one or more respects, such as, for example, in size, shape, configuration, and/or material, just to name a few possibilities.

The resting surface accessory 10 can be used in connection with a vehicle. As used herein, "vehicle" means any form of motorized transport. In one or more implementations, the vehicle can be an automobile. While arrangements will be described herein with respect to automobiles, it will be understood that embodiments are not limited to automobiles. In some implementations, the vehicle may be a watercraft, an aircraft or any other form of motorized transport.

Figure 4:
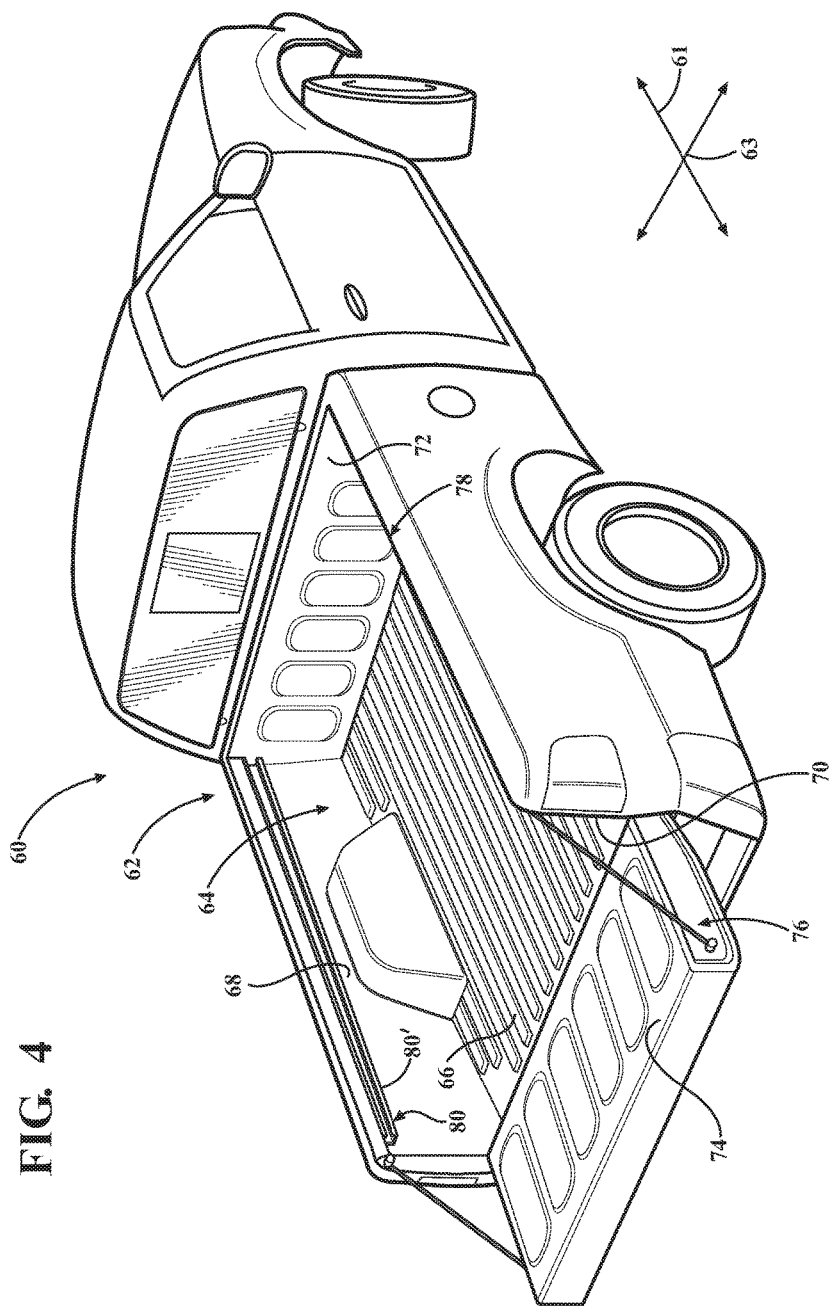
FIG. 4 is a view of a pickup truck, showing an accessory rail extending along a lateral side wall of a bed of the pickup truck.

One non-limiting example of a vehicle in which the resting surface accessory 10 will now be described in connection with FIG. 4. FIG. 4 shows a portion of a pickup truck 60. The pickup truck 60 can include one or more vehicle spaces 62 in which the resting surface accessory 10 can be used. The vehicle space 62 can be any open area of the pickup truck 60 or other vehicle. For instance, the vehicle space 62 can be a cargo area or bed 64. The bed can be defined at least in part by a floor 66, a first lateral side wall 68, a second lateral side wall 70, a forward wall 72, and a back wall 74. The back wall 74 can be defined by a tailgate 76. The bed 64 can define a vehicle space 62 that is substantially rectangular. The bed 64 can have an open top 78, which can be covered by a removable cover or topper. The first lateral side wall 68 and the second lateral side wall 70 can be substantially parallel to each other. The forward wall 72 and the back wall 74 can be substantially parallel to each other. The pickup truck 60 can have an associated longitudinal direction 61 and an associated lateral direction 63.

The bed 64 can include one or more accessory rails 80. The one or more accessory rails 80 can be existing structures or they can be added to the bed 64. In one or more arrangements, a first accessory rail 80' can be operatively connected to and extend along the first lateral side wall 68, and a second accessory rail 80" can be operatively connected to and extend along the second lateral side wall 70. The first and second accessory rails 80', 80" can be operatively connected to the first and second lateral side walls 68, 70 in any suitable manner, such as by one or more fasteners, one or more adhesives, one or more welds, one or more forms of mechanical engagements, and/or combinations thereof, just to name a few possibilities. In one or more arrangements, the first accessory rail 80' and the second accessory rail 80" can extend substantially parallel to each other.

The accessory rails 80 can have any suitable shape or configuration. The accessory rails 80 can be configured to receive the first connectors 30 and/or the second connectors 32 of the resting surface accessory 10. In one or more arrangements, the accessory rails 80 can have a general c-shaped cross-sectional shape. The accessory rails 80 can be made of any suitable materials, including, for example, metal or plastic.

The accessory rails 80 can include a passage 82 (FIG. 5) into which the first connector 30 or the second connector 32 of the resting surface accessory 10 can be received. At least one of the ends of the passage 82 can be open or selectively closeable (e.g., by a cap, closure element, movable door, etc.). The accessory rail 80 can include a longitudinal slit 84 to allow the passage of a portion of the main body 12 of the resting surface accessory 10. The longitudinal slit 84 can also facilitate movement of the resting surface accessory 10 along the accessory rail 80.

Figure 5:
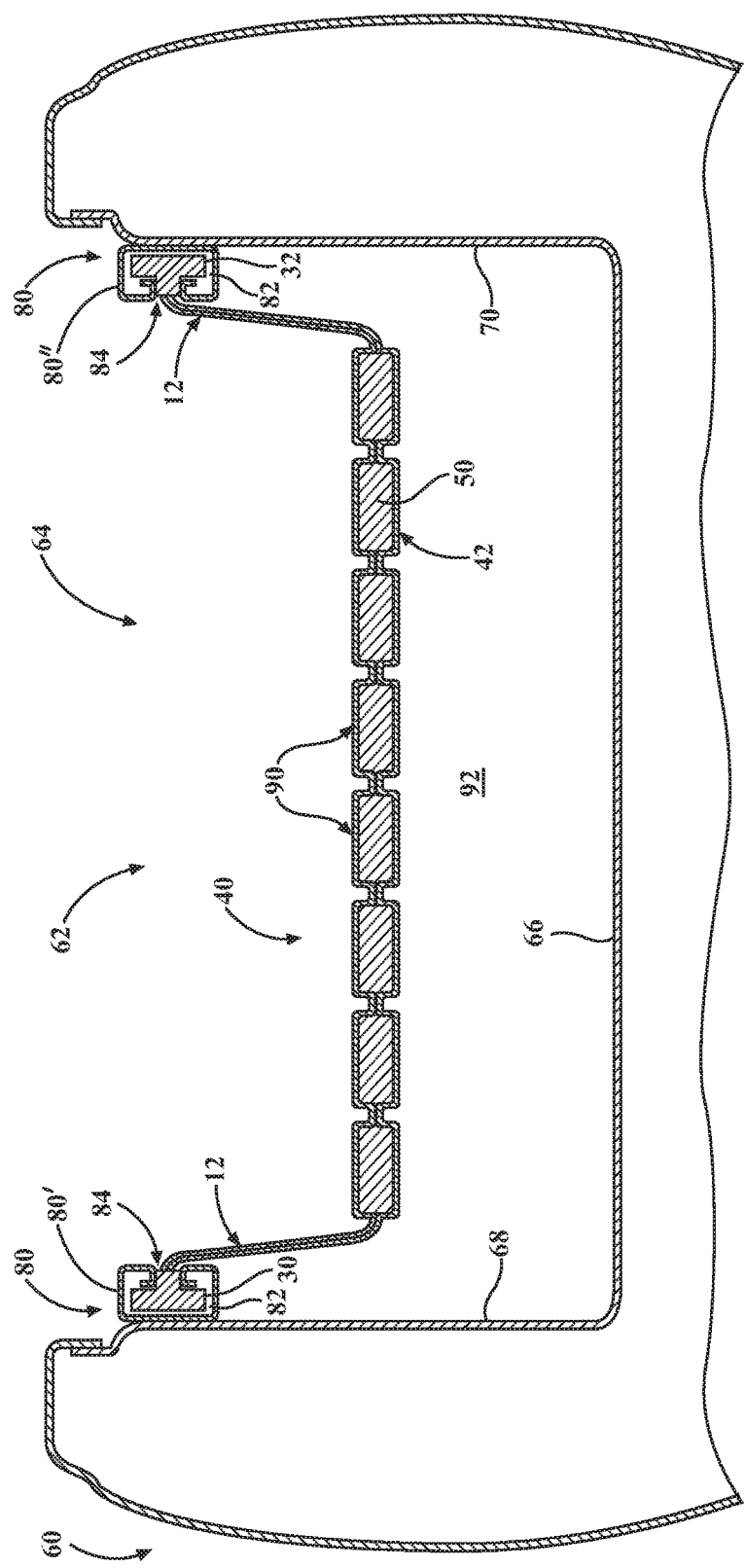
FIG. 5 is a cross-sectional view of the resting surface accessory installed in the bed of the pickup truck.

FIG. 5 shows an example of the resting surface apparatus installed in a vehicle space 62 (e.g., the bed 64 of the pickup truck 60). As is shown, the resting surface accessory 10 can be operatively connected to the accessory rails 80. In particular, the first connector 30 of the resting surface accessory 10 can be received in the first accessory rail 80', and the second connector 32 of the resting surface accessory 10 can be received in the second accessory rail 80". The main body 12 of the resting surface accessory 10 can pass through the longitudinal slits 84 of the first and second accessory rails 80', 80". From there, the main body 12 of the resting surface accessory 10 can drop downwardly to the central region 40. Inserts 50 can be received in the cavity 43 of the plurality of sleeves 42. The inserts 50 can be placed in the sleeves 42 at any suitable time, including before or after the resting surface accessory 10 is operatively connected to the accessory rails 80. The central region 40 of the resting surface accessory 10 can extend substantially horizontally across a portion of the bed 64.

A portion of the upper side 16 of the resting surface accessory can define a resting surface 90. The resting surface 90 can be located above the floor 66 of the bed 64 in the vertical direction. In some arrangements, the resting surface 90 can be located below the accessory rails 80 in the vertical direction. In some arrangements, the resting surface 90 can be located at substantially the same elevation as the accessory rails 80.

The resting surface 90 can be configured to support one or more vehicle occupants (e.g., a person) thereon. In one or more arrangements, a person can lay directly on the resting surface 90. In this way, the resting surface accessory 10 can act as a hammock or as a bed. As such, a person can rest or sleep on the resting surface 90.

Figure 6:
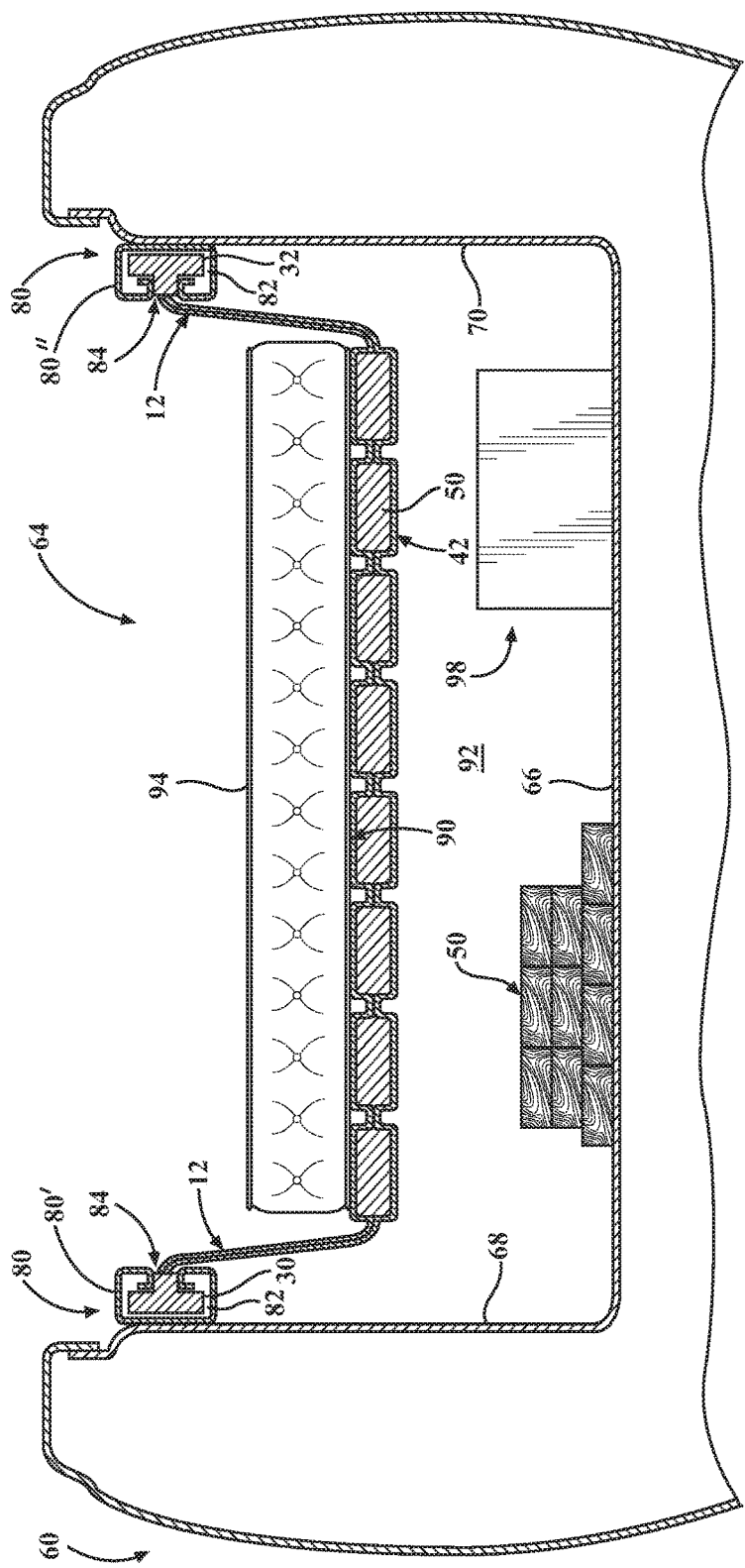
FIG. 6 is a partial cross-sectional view of the resting surface accessory installed in the bed of the pickup truck, showing a mattress supported on the resting surface accessory and one or more items stored below the resting surface accessory.

Referring to FIG. 6, additional items may be supported on the resting surface 90. For example, a mattress 94 can be supported on the resting surface 90. The mattress 94 can be made of any suitable type of mattress, including a foam, air, gel, water, and/or fluid mattress. In at least some instances, the mattress 94 can have a deployed configuration (as shown in FIG. 6) and a storage configuration. In one or more arrangements, the mattress 94 can be configured to be selectively rolled and unrolled. In one or more arrangements, the mattress 94 can be configured to be selectively inflated and deflated. In one or more arrangements, the mattress 94 can be configured to be selectively folded and unfolded. For instance, a person may place a blanket, sheet, mattress, pillow, cushion, sleeping bag, pad, or other article on the resting surface 90.

The resting surface accessory 10 can function as a divider to define a storage space 92 below the resting surface 90. The user can use the storage space 92 to store various items. For instance, the user can store additional inserts 50 in the storage space 92. Alternatively or in addition, the user can store one or more other items 98 in the storage space 92.

When not in use, the resting surface accessory 10 can remain operatively connected to the accessory rails 80. Alternatively, the resting surface accessory 10 can be disconnected from the accessory rails 80, the inserts 50 may or may not be removed from the sleeves 42, and the resting surface accessory 10 can be stored onboard the pickup truck 60 or elsewhere. It will be appreciated that, in one or more examples, that the resting surface accessory 10 can be rolled, folded, stuffed, or otherwise manipulated to facilitate compact storage.

The resting surface accessory 10 can be provided in any suitable manner. As an example, the resting surface accessory 10 can be provided as an accessory package on a vehicle, either as optional equipment when q vehicle is purchased or as an after-market item. In some instances, the resting surface accessory 10 can be provided as a kit. In one or more arrangements, the kit can include one or more of the resting surface accessories 10. In one or more arrangements, the kit can include a plurality of inserts 50 for use with the resting surface accessory 10.

It will be appreciated that arrangements described herein can be used in a variety of situations. Non-limiting examples will now be described. In some instances, a driver or passenger of may become sleepy or tired. In such instances, the truck can be parked and the resting surface accessory can be installed in the bed of the truck. The vehicle occupant can sleep or rest on the support surface provided by the resting surface accessory. Similarly, the resting surface accessory can be used for camping. In this respect, a camper can sleep in his or her vehicle without the need for a tent. The resting support surface can also be used during different events (e.g., concerts, fireworks displays, tailgating, etc.) for comfortable viewing.

It will be appreciated that arrangements described herein can provide numerous benefits, including one or more of the benefits mentioned herein. For example, arrangements described herein can provide a comfortable bed or resting surface for a vehicle user. Arrangements described herein can allow for relatively rapid set-up. Arrangements described herein can allow for relatively easy disassembly and compact storage. Arrangements described herein can maximize or increase the usage of the vehicle spaces by allowing a person to rest or sleep on the support surface while allowing for storage below the support surface. Arrangements described herein can provide convenience to users of a vehicle.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A resting surface accessory for vehicle occupants, the resting surface accessory comprising:
    a main body having a first lateral side and a second lateral side, the second lateral side being opposite to the first lateral side, the main body including a central region with a plurality of sleeves, each of the sleeves defining a cavity, the plurality of sleeves being spaced from the first lateral side and the second lateral side, the plurality of sleeves extending in substantially the same direction as at least one of the first lateral side and the second lateral side, the plurality of sleeves having a forward end and an aft end, at least one of the forward end and the aft end of one or more of the plurality of sleeves being one of: open or selectively openable and closeable;
    a first connector operatively connected to the main body and extending along the first lateral side, the first connector being configured for attachment to a portion of a vehicle; and
    a second connector operatively connected to the main body and extending along the second lateral side, the second connector being configured for attachment to a portion of a vehicle.

2. The resting surface accessory of claim 1, wherein at least one of the first connector and the second connector is substantially t-shaped.

3. The resting surface accessory of claim 1, wherein the main body includes a first layer and a second layer, and wherein the plurality of sleeves are defined by the first layer and the second layer.

4. The resting surface accessory of claim 1, wherein the main body is made of canvas.

5. The resting surface accessory of claim 1, wherein the main body includes spacer portions between neighboring sleeves, whereby neighboring sleeves are spaced apart.

6. The resting surface accessory of claim 1, wherein the plurality of sleeves are substantially parallel to at least one of the first lateral side or the second lateral side.

7. A resting surface accessory for vehicle occupants, the resting surface accessory comprising:
    a main body having a first lateral side and a second lateral side, the second lateral side being opposite to the first lateral side, the main body including a central region with a plurality of sleeves, each of the sleeves defining a cavity, the plurality of sleeves being spaced from the first lateral side and the second lateral side;
    a plurality of inserts, each of the plurality of inserts being received in the cavity of a respective one of the sleeves;
    a first connector operatively connected to the main body and extending along the first lateral side; and
    a second connector operatively connected to the main body and extending along the second lateral side.

8. The resting surface accessory of claim 7, wherein the inserts are rectangular inserts, and wherein plurality of sleeves are configured to receive rectangular inserts.

9. A system comprising:
    a vehicle space defined in part by a floor, a first lateral side wall, and a second lateral side wall, the first lateral side wall being spaced from and opposite to the second lateral side wall; and
    a resting surface accessory including:
        a main body having a first lateral side and an opposite second lateral side, the main body including a central region with a plurality of sleeves, each of the sleeves defining a cavity, the plurality of sleeves being spaced from the first lateral side and the second lateral side;
        a first connector operatively connected to the main body and extending along the first lateral side; and
        a second connector operatively connected to the main body and extending along the second lateral side,
    the first lateral side of the resting surface accessory being operatively connected to the first lateral side wall of the vehicle space by the first connector, the second lateral side of the resting surface accessory being operatively connected to the second lateral side wall of the vehicle space by the second connector, the resting surface accessory being spaced from the floor such that a storage space is defined therebetween, at least a portion of the central region of the resting surface accessory defining a support surface.

10. The system of claim 9, further including a plurality of inserts, each of the plurality of inserts being received in the cavity of a respective one of the sleeves.

11. The system of claim 10, wherein the inserts are rectangular inserts, and wherein plurality of sleeves are configured to receive rectangular inserts.

12. The system of claim 10, further including a mattress, wherein the mattress is supported on the support surface.

13. The system of claim 9, wherein the support surface extends substantially horizontally across the vehicle space.

14. A system comprising:
    a vehicle space defined in part by a floor, a first lateral side wall, and a second lateral side wall, the first lateral side wall being spaced from and opposite to the second lateral side wall;
    a first accessory rail operatively connected to the first lateral side wall;
    a second accessory rail operatively connected to the second lateral side wall; and
    a resting surface accessory including:
        a main body having a first lateral side and an opposite second lateral side, the main body including a central region with a plurality of sleeves, each of the sleeves defining a cavity, the plurality of sleeves being spaced from the first lateral side and the second lateral side;
        a first connector operatively connected to the main body and extending along the first lateral side; and
        a second connector operatively connected to the main body and extending along the second lateral side,
    wherein the first connector is received in the first accessory rail, whereby the first lateral side of the resting surface accessory being operatively connected to the first lateral side wall of the vehicle space, and wherein the second connector is received in the second accessory rail whereby the second lateral side of the resting surface accessory being operatively connected to the second lateral side wall of the vehicle space, the resting surface accessory being spaced from the floor such that a storage space is defined therebetween, at least a portion of the central region of the resting surface accessory defining a support surface.

15. The system of claim 14, wherein the support surface is located below the first accessory rail and the second accessory rail in the substantially vertical direction.

16. The system of claim 9, wherein the vehicle space is defined by a cargo area of a vehicle.

17. A system comprising:
a pickup truck including a bed, the bed including a floor, a first lateral side wall, and a second lateral side wall, the first lateral side wall being spaced from and opposite to the second lateral side wall; and
a resting surface accessory including:
a main body having a first lateral side and an opposite second lateral side, the main body including a central region with a plurality of sleeves, each of the sleeves defining a cavity, the plurality of sleeves being spaced from the first lateral side and the second lateral side;
a first connector operatively connected to the main body and extending along the first lateral side; and
a second connector operatively connected to the main body and extending along the second lateral side,
the first lateral side of the resting surface accessory being operatively connected to the first lateral side wall of the bed by the first connector, the second lateral side of the resting surface accessory being operatively connected to the second lateral side wall of the bed by the second connector, the resting surface accessory being spaced from the floor such that a storage space is defined therebetween, at least a portion of the central region of the resting surface accessory defining a support surface, the support surface extending substantially horizontally across the bed.

18. The system of claim 17, further including a plurality of inserts, each of the plurality of inserts being received in the cavity of a respective one of the sleeves.

19. The system of claim 17, further including a mattress, wherein the mattress is supported on the support surface.

20. A system comprising:
a pickup truck including a bed, the bed including a floor, a first lateral side wall, and a second lateral side wall, the first lateral side wall being spaced from and opposite to the second lateral side wall;
a first accessory rail operatively connected to the first lateral side wall;
a second accessory rail operatively connected to the second lateral side wall; and
a resting surface accessory including:
a main body having a first lateral side and an opposite second lateral side, the main body including a central region with a plurality of sleeves, each of the sleeves defining a cavity, the plurality of sleeves being spaced from the first lateral side and the second lateral side;
a first connector operatively connected to the main body and extending along the first lateral side; and
a second connector operatively connected to the main body and extending along the second lateral side,
the first connector being received in the first accessory rail, whereby the first lateral side of the resting surface accessory is operatively connected to the first lateral side wall, the second connector being received in the second accessory rail, whereby the second lateral side of the resting surface accessory is operatively connected to the second lateral side wall, the resting surface accessory being spaced from the floor such that a storage space is defined therebetween, at least a portion of the central region of the resting surface accessory defining a support surface, the support surface extending substantially horizontally across the bed, and the support surface being located below the first accessory rail and the second accessory rail in the substantially vertical direction.

\* \* \* \* \*